US008496256B2

(12) United States Patent
Bebernes et al.

(10) Patent No.: US 8,496,256 B2
(45) Date of Patent: Jul. 30, 2013

(54) STEERING ASSIST FOR A REAR CASTER WHEEL ON A WORK MACHINE

(75) Inventors: Thomas Daryl Bebernes, Ottumwa, IA (US); Eric Ryan Lang, Donnellson, IA (US); David Vincent Rotole, Bloomfield, IA (US); Timothy K. Dreger, Platteville, WI (US)

(73) Assignee: Deere & Company, Moline, IL (US)

( * ) Notice: Subject to any disclaimer, the term of this patent is extended or adjusted under 35 U.S.C. 154(b) by 1115 days.

(21) Appl. No.: 11/957,800

(22) Filed: Dec. 17, 2007

(65) Prior Publication Data

US 2009/0152828 A1 Jun. 18, 2009

(51) Int. Cl.
*B60B 33/00* (2006.01)

(52) U.S. Cl.
USPC .............................. 280/86; 180/6.48; 180/411

(58) Field of Classification Search
USPC ................................... 180/6.48, 411; 280/86
See application file for complete search history.

(56) References Cited

U.S. PATENT DOCUMENTS

| 4,376,371 | A | * | 3/1983 | Kojima et al. | ................... | 60/420 |
| 5,221,100 | A | * | 6/1993 | McNutt | ........................... | 280/78 |
| 6,129,495 | A | * | 10/2000 | Marshall | ......................... | 414/12 |
| 6,237,708 | B1 | * | 5/2001 | Kawada | ........................ | 180/53.7 |
| 2005/0115746 | A1 | * | 6/2005 | Dunn et al. | ..................... | 180/6.2 |
| 2005/0127744 | A1 | * | 6/2005 | Bucci | .............................. | 303/10 |

* cited by examiner

*Primary Examiner* — Tony H. Winner
*Assistant Examiner* — Jacob Knutson

(57) ABSTRACT

A work machine includes a frame, at least one drive wheel carried by the frame, at least one caster wheel assembly carried by the frame, and at least one turn assist arrangement. Each turn assist arrangement is coupled between the frame and a corresponding caster wheel assembly. Each turn assist arrangement is configured to bias the corresponding caster wheel assembly during an operator commanded turn, and to be overridden by forces applied by the ground to the caster wheel assembly.

25 Claims, 5 Drawing Sheets

STEERING ASSIST FOR A REAR CASTER WHEEL ON A WORK MACHINE

FIELD OF THE INVENTION

The present invention relates to work machines, and, more particularly, to a steering arrangement for steering such work machines.

BACKGROUND OF THE INVENTION

Work machines may sometimes include one or more caster wheels which are carried by a machine frame and free to rotate about a generally vertical axis 360°. The caster wheel assembly typically includes a shaft defining an axis of rotation, a fork rigidly attached to the bottom end of the shaft, and a caster wheel coupled with the distal ends of the fork. Examples of such work machines include windrowers, lawn mowers, etc.

Self-propelled windrowers are typically driven through a dual-path hydrostatic system. Speed changes are made by adjusting the speed of both drive (front) wheels simultaneously. Direction changes are made by adjusting the relative speed of the drive wheels. The rear wheels of the machine are castered to allow the machine to pivot during direction changes.

When direction changes are made, hydraulic pressure builds in one drive wheel circuit to increase speed and is reduced in the other drive wheel to lower the speed. This relative pressure difference prevails until the inertia of the machine and the inherent turn resistance of the casters is overcome. If the turn resistance is high enough to produce a noticeable delay in the reaction to the steering wheel input, control of the machine can be difficult.

Turn resistance of the caster wheels results from friction in the pivot of the caster assembly and friction between the castered wheels and the ground. Reaction delay can be particularly pronounced if the machine is operated without the platform because the added weight on the casters results in increased turn resistance. Low inflation pressures (e.g., 14 psi) are often specified in the castered tires to improve ride quality. This further increases turn resistance if the machine is operated with the platform removed.

Steering characteristics are dependent on such things as steering linkages, hydrostatic pump reaction time, the machine's turning inertia, and caster turn resistance. There is a tendency for a steering input to have a slow reaction (understeer) at initiation, then a tendency to keep turning (oversteer) when the input is stopped or reversed. Because of this, control of the machine can be difficult, particularly at higher speeds. Windrowers typically have a maximum speed in transport in the 15 mph range. Transport speeds up to 25 miles per hour (mph) would be an advantage in the market. This requires better machine controllablity at higher speeds without sacrificing the agility of the current system (spin steer) at lower speeds.

At least one third party competitor advertises a windrower with a transport speed of 23 mph. This is achieved by reversing the operator's station and operating the machine in the reverse direction for transport.

A secondary problem with current windrower drives is transport of the windrower with the platform removed. Reaction delay can be particularly pronounced if the machine is operated without the platform due to the added weight on the casters and the resulting increase in turn resistance.

It may also be desirable to dismount a platform and transport it by towing it behind the traction unit. This is difficult with current windrower configurations because the rear of the windrower, which is controlled by the drive (front) wheels, must swing in reaction to steering inputs and, conversely, inputs from the towed platform must be resisted by the drive wheels.

The assignee of the present invention currently instructs operators to not transport a windrower traction unit with the platform dismounted. Wider platforms designed to be removed easily from the traction unit increase the importance of transport without a platform.

It is known to transport a windrower without the platform by providing a portable weight to carry in place of the platform during transport. This balances the traction unit and allows "slow speed transport" with the platform in tow. Disadvantages to this approach include the logistics of having the weight with the traction unit when needed, the inconvenience of attaching and removing the weight, and the added cost of the option.

SUMMARY OF THE INVENTION

The invention in one form is directed to a work machine, including a frame; at least one drive wheel carried by the frame; at least one caster wheel assembly carried by the frame; and at least one turn assist arrangement. Each turn assist arrangement is coupled between the frame and a corresponding caster wheel assembly. Each turn assist arrangement is configured to bias the corresponding caster wheel assembly during an operator commanded turn, and to be overridden by forces applied by the ground to the caster wheel assembly.

The invention in another form is directed to a steering arrangement for a work machine, including a frame; a caster wheel assembly carried by the frame; and a turn assist cylinder coupled between the frame and the caster wheel assembly. The turn assist cylinder is configured to:
  a) apply a biasing force to the caster wheel assembly during an operator commanded turn,
  b) allow the biasing force to be overrode by forces applied by the ground to the caster wheel assembly, and
  c) allow the caster wheel assembly to rotate 360° about a generally vertical axis.

The invention in yet another form is directed to a work machine, including a frame, at least one caster wheel assembly carried by the frame, and at least one turn assist arrangement. Each turn assist arrangement is coupled between the frame and a corresponding caster wheel assembly. Each turn assist arrangement biases the corresponding caster wheel during an operator commanded turn and allows the caster wheel to rotate 360° about the axis of the shaft.

DETAILED DESCRIPTION OF THE INVENTION

Figure 1:
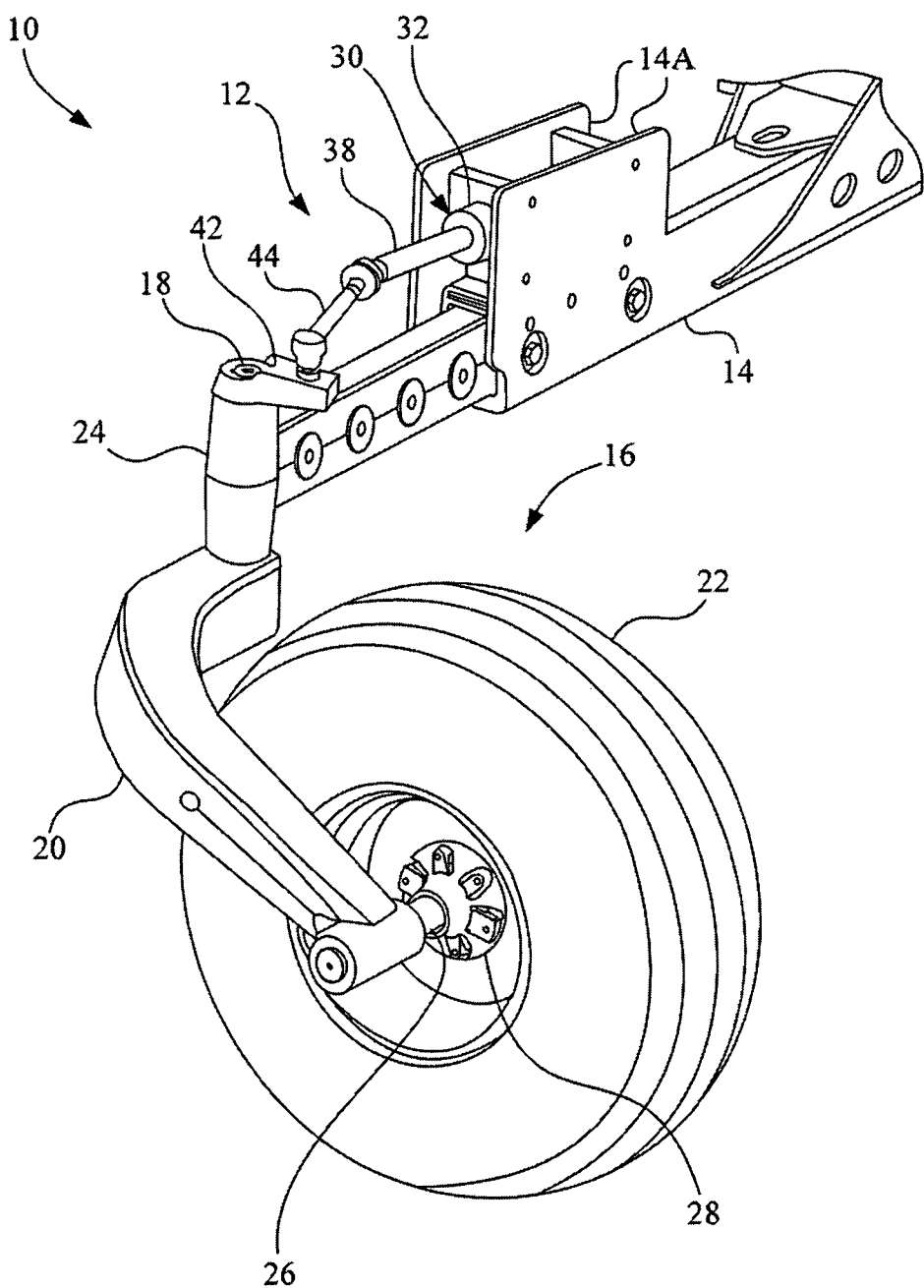
FIG. 1 is a perspective view of a portion of a work machine incorporating an embodiment of a turn assist arrangement of the present invention.
Figure 2:
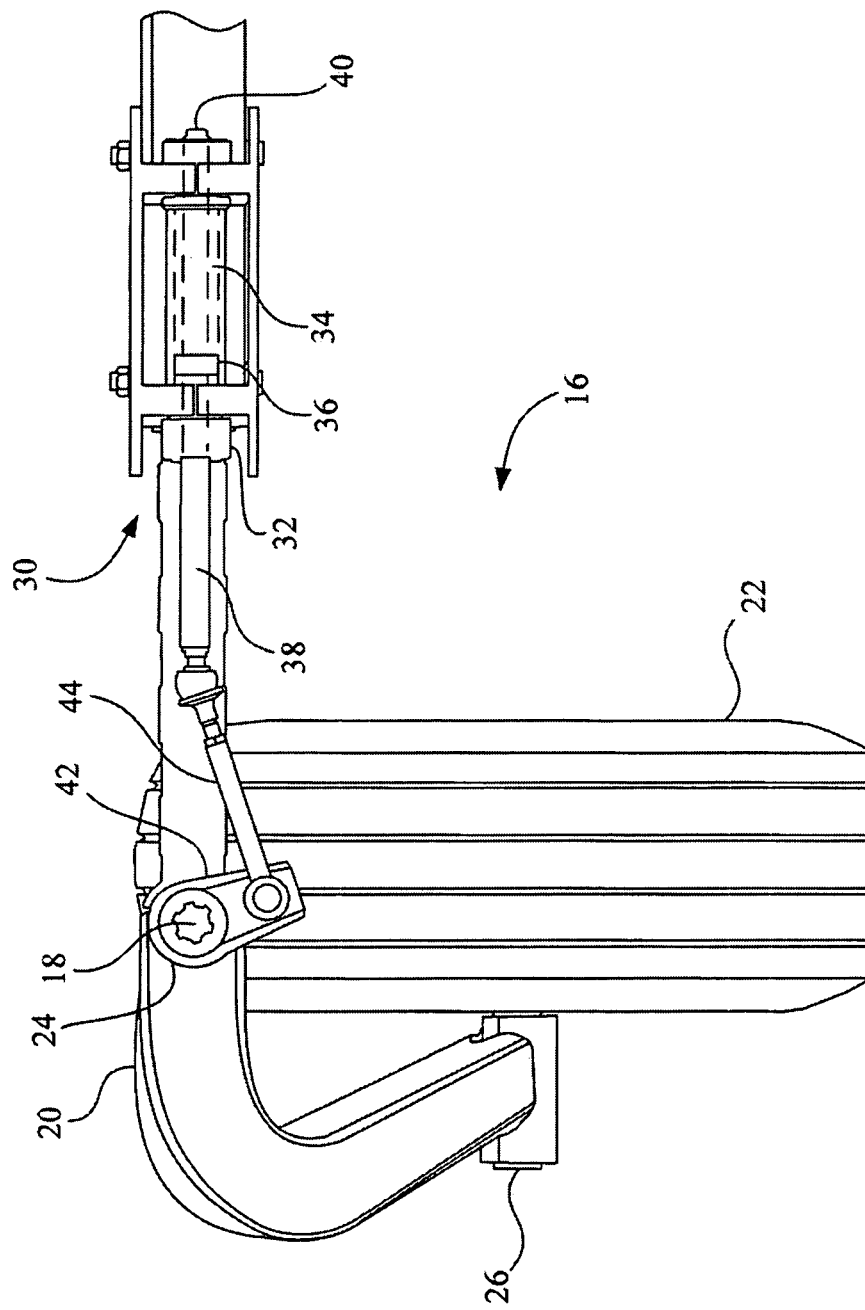
FIG. 2 is a top view of the portion of the work machine shown in FIG. 1.

Referring now to the drawings, and more particularly to FIGS. 1 and 2, there is shown a portion of a work machine 10 incorporating an embodiment of a turn assist arrangement 12 of the present invention. Work machine 10 can be any type of self-propelled work machine using one or more caster wheels, such as a windrower, lawn mower, etc. In the embodiment shown, the left rear portion of a work machine in the form of a windrower 10 is shown for illustration.

Windrower 10 includes a frame 14 carrying typical components (not shown) such as an operator's station, internal combustion engine, etc. A cutting platform is typically detachably mounted at the front end of the machine below the operator's station. The engine compartment is typically mounted behind the operator's station and above a pair of caster wheel assemblies 16. Only the left rear caster wheel 16 is shown in FIGS. 1 and 2 for simplicity, the right rear caster wheel being configured substantially identical in the illustrated embodiment. Some differences in the configurations of the caster wheel assemblies 16 are possible, as will be described in more detail below.

Each caster wheel assembly 16 includes a pivotable shaft 18, a wheel arm 20 and a caster wheel 22 coupled with wheel arm 20. Shaft 18 is rotatably carried within a collar 24 which is welded or otherwise rigidly affixed to frame 14. As shown in FIG. 1, the machine frame 14 may include a telescoping axle having an outboard end carrying collar 24. Wheel arm 20 is shown as a single arm which curves around to the side of wheel 22, thus putting wheel 22 generally in line with shaft 18. Wheel arm 20 can also be configured as a fork with distal ends on opposite sides of wheel 22. The lower or distal end of wheel arm 20 carries a stub shaft 26, which in turn carries a wheel hub 28 for mounting wheel 22 in known fashion.

Turn assist arrangement 12 is configured as a linear actuator to be described in more detail hereinafter, but may also be configured as a rotary or other type actuator, as will become more apparent hereinafter. Turn assist arrangement 12 includes one or more turn assist cylinders 30 which are coupled between frame 14 and a corresponding caster wheel assembly 16. In the embodiment shown, windrower 10 has two turn assist cylinders 30 coupled to respective caster wheel assemblies. Each turn assist cylinder 30 biases a corresponding caster wheel assembly 16 during an operator commanded turn but may be overrode by forces applied by the ground to caster wheel assembly 16. More particularly, each turn assist cylinder 30 is configured to provide the following functionality:

a) apply a biasing force to the caster wheel assembly during an operator commanded turn;

b) allow the biasing force to be overrode by forces applied by the ground to the caster wheel assembly; and c) allow the caster wheel assembly to rotate 360° about an axis of rotation.

Each turn assist cylinder 30 is in the form of a two-way cylinder with a housing 32 defining an inner chamber 34, a piston 36 slidably disposed in inner chamber 34, and a rod 38 extending from piston 36 through housing 32 (interior components of turn assist cylinder 30 are shown in phantom lines in FIG. 2). Housing 32 is carried by mounting plates 14A, which are considered for practical purposes to be part of frame 14. In the embodiment shown, each turn assist cylinder 30 also includes a second rod 40 extending from piston 36 through housing 32. Rod 38 and second rod 40 are disposed on opposite sides of piston 36, with second rod 40 providing an equal fluid displacement from inner chamber 34 regardless of a travel direction of piston 36. It will be understood, however, that a single piston rod 38 may be utilized.

Turn assist arrangement 12 is shown with a pair of turn assist cylinders 30, with each turn assist cylinder 30 being coupled between frame 14 and a corresponding caster wheel assembly 16. However, it is also possible to configure turn assist arrangement 12 with a single turn assist cylinder 30 coupled between frame 14 and one caster wheel assembly 16, the other caster wheel being free turning. Alternatively, turn assist arrangement 12 may be configured with a single turn assist cylinder 30 coupled between frame 14 and one caster wheel assembly 16, the one caster wheel assembly being coupled via a tie rod or the like with the other caster wheel assembly.

Turn assist arrangement 12 also includes a pivot arm 42 associated with each caster wheel shaft 18, and a ball linkage 44 interconnecting each piston rod 38 with a corresponding pivot arm 42. Pivot arm 42 is rigidly affixed to and extends radially outward from the top end of shaft 18 and rotates or pivots therewith, such as through a suitable keyed connection. The length of pivot arm 42 may be selected dependent upon the desired amount of turn assist force, etc. Pivot arm 42 has an opposite, distal end which is coupled with one end of ball linkage 44, which in turn has an opposite end which is coupled with the outer end of piston rod 38. Ball linkage 44 may have an adjustable length using a threaded rod and lock nut arrangement, as shown. Turn assist arrangement 12 is thus configured with a stroke length of rod 38, ball linkage 44 and pivot arm 42 allowing full 360 degree rotational movement of caster wheel 22 about the axis of shaft 18. This may be important when changing directions of windrower 10 from forward to reverse, or vice versa, or for side loads applied to wheel 22 due to ground terrain variations, etc.

Figure 3:
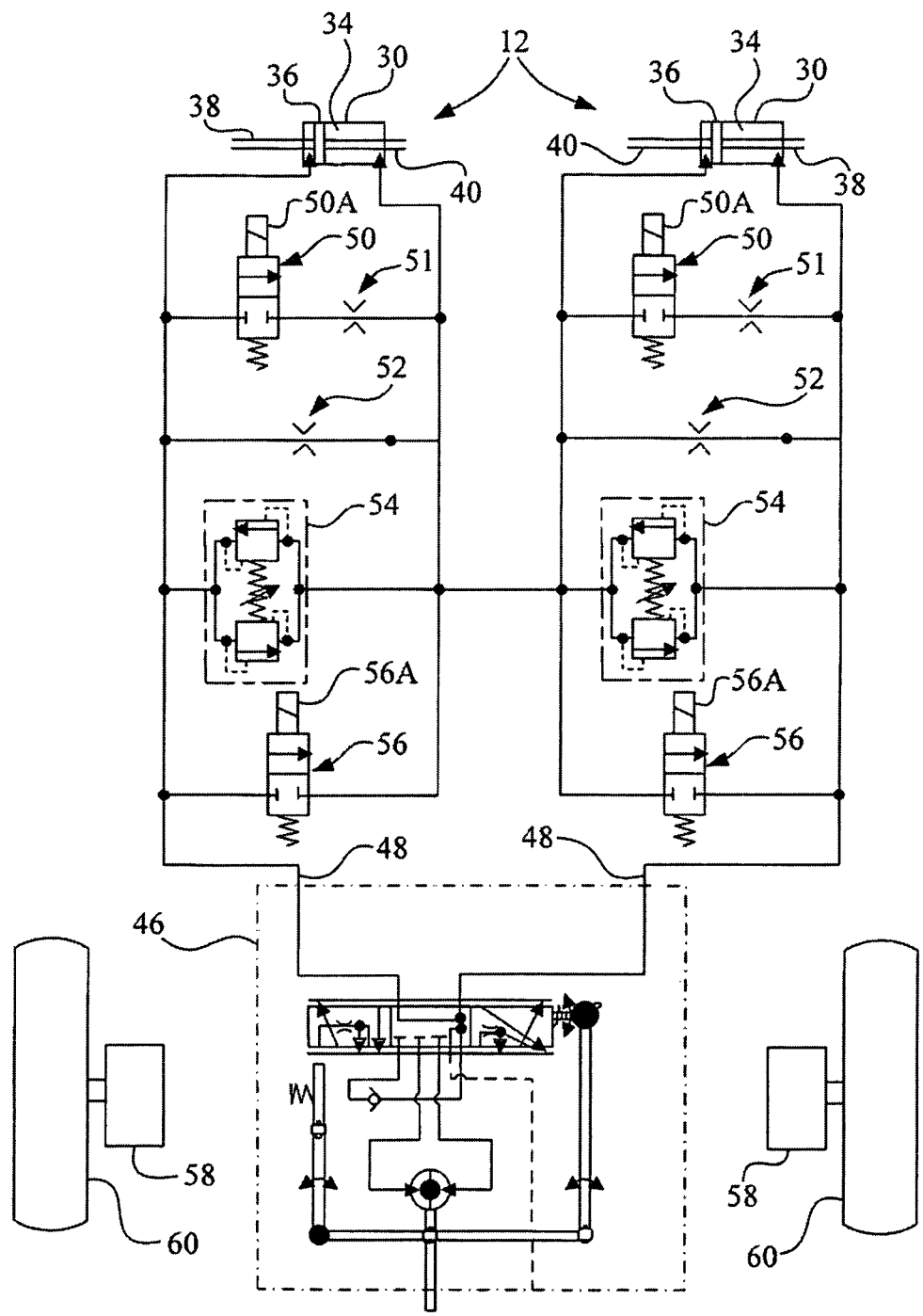
FIG. 3 is a schematic illustration of the turn assist arrangement utilized in the work machine of FIGS. 1 and 2.

Referring now to FIG. 3, turn assist arrangement 12 is shown in schematic form coupled with a hydraulic steering circuit 46. Hydraulic steering circuit 46 can be actuated, e.g., via a mechanical linkage associated with the steering column on the operator's station, an electronic sensing of the position of the steering column (windrower) or joy sticks (lawnmower), etc. Hydraulic steering circuit 46 provides dual hydraulic outputs 48 of independently varying pressure, is conventional in design, and is not described in great detail herein.

Inner chamber 34 on each side of piston 36 is fluidly coupled with hydraulic steering circuit 46 whereby a pressure differential on opposite sides of piston 36 exists during turning of windrower 10. This pressure differential causes a biasing or turn assist force to be applied to wheel 22. In the embodiment shown, hydraulic steering circuit 46 is a stand-alone hydraulic circuit which is separate from the dual-path hydrostatic system providing motive force to windrower 10. However, hydraulic steering circuit 46 can also be integral with a dual-path hydrostatic system associated with the drive wheels of windrower 10.

As shown in FIG. 3 and described above, windrower 10 includes two turn assist cylinders 30. Turn assist cylinders 30 are coupled in series with each other, and each turn assist cylinder 30 is fluidly coupled with a number of valves and orifices, each of which can be separate from or integrally formed with a corresponding turn assist cylinder 30. A hydraulic pressure input from hydraulic steering circuit 46 moves a piston 36 in one turn assist cylinder 30, which in turn forces hydraulic fluid to the other turn assist cylinder and moves the piston 36 in that turn assist cylinder 30 (referred to as a fluid tie rod).

More particularly, the windrower is configured to provide two speed ranges: a field range providing a maximum forward speed of about 12 mph; and a transport range providing a maximum forward speed of about 25 mph. Each turn assist cylinder 30 is fluidly coupled in parallel on opposite sides of a corresponding piston 36 with a low speed field orifice 51, higher speed transport orifice 52, high pressure relief valve 54 and machine direction change valve 56.

Transport orifice 52 is always in an open state regardless of the ground speed or selected speed range of windrower 10. Transport orifice 52 allows fluid to flow across piston 36 of turn assist cylinder 30 such that each caster wheel 22 can independently move to align itself with the position required by the dual-path hydrostatic system associated with the primary drive wheels. Transport orifice 52 is sized relative to hydraulic steering circuit 46 such that caster wheel position corrections are allowed, but steering inputs from hydraulic steering circuit 46 are obeyed. In the embodiment shown, transport orifice 52 is a two way orifice having a diameter of approximately 0.03 inch. Transport orifice 52 may be selected with a different diameter, dependent upon the specific application. A smaller orifice will allow more precise control from the steering assist circuit, but will not self-align to the dual-path system as readily.

Field valve 50 is an on/off valve which is actuated using integral solenoid 50A. In the embodiment shown, field valve 50 controls flow to orifice 51 which has a diameter of approximately 0.04 inch. Valve 50 is open at a ground speed at or below a first threshold value (e.g., a typical working speed at or below approximately 12 mph). At low speeds below the preselected first threshold value, field valve 50 is open to allow fluid to flow more freely from one end to the other of turn assist cylinder 30 with less restriction than provided in the transport speed range. This allows each caster wheel 22 to turn with less hydraulic resistance regardless of inputs from the hydraulic steering circuit 46 so that spin turns and machine maneuverability is enhanced.

High pressure relief valve 54 may be of conventional design and is configured to open above a predetermined fluid pressure. High pressure relief valve 54 allows fluid flow in either direction and in essence is a safety valve that allows the caster wheel 22 to turn regardless of the steering bias input, such as turns at the end of a field, etc. In the embodiment shown, high pressure relief valve 54 is set to open at a fluid pressure of approximately 1000 psi.

Machine direction change valve 56 is open at low speeds to enable machine direction changes from forward to reverse, or vice versa. In the transition, a conflict exists in which the inputs from hydraulic steering circuit 46 are in conflict with the inputs to ground wheel 22 from the ground while caster wheel spins around from one direction to the other. Machine direction change valve 56 is an on/off valve which is actuated using a solenoid 56A, and accommodates this change in machine direction. Machine direction change valve 56 closes at increasing ground speed to engage the inputs from hydraulic steering circuit 46. The speed at which direction change valve 56 closes is chosen such that caster wheels 22 will likely be parallel to each other and close to the correct forward machine direction position. Direction change valve 56 opens again at decreasing speeds, most likely at a speed less than the engaging speed (hysterisis) to prevent valve chatter at speeds near the designated activating or deactivating speed.

As an option, it is also possible to use the hydraulic pressure associated with the dual path hydrostatic system as an input to each turn assist cylinder 30. Pressure to each side of each turn assist cylinder 30 is controlled by the inlet pressure at a drive wheel motor 58 coupled with a drive wheel 60. The pressure at the left drive wheel motor 58 controls pressure to one side of piston 36 while pressure at the right drive wheel motor controls pressure to the other side of piston 36. In the condition where the machine is traveling straight ahead, the pressures will be nearly equal, so no turn assist is provided at the caster wheel. When a turn is initiated, pressure increases at the drive wheel motor with increasing speed and decreases at the motor with decreasing speed. This results in a differential pressure across the piston of the caster pivot assist cylinder which assists the caster pivot in the appropriate direction. The amount of assist will be proportional to differences in pressures at the drive motors and so proportional to the rate of turn commanded by the operator. Once the turn is established, pressures again equalize at the drive wheel motors and the caster pivot assist neutralizes. When the machine is operated in reverse, the inlet wheel motor ports become the outlet ports. In this condition, pressure on each side of the caster assist cylinder piston will be low with little differential pressure so there will not be a significant assist force.

As another option, it may also be possible to add grooves or ports within turn assist cylinders 30 to allow caster wheels 22 to turn more freely at increasing caster turn angles. This may be an alternate way to allow spin turns or machine reverses without requiring direction change valves 56.

Figure 4:
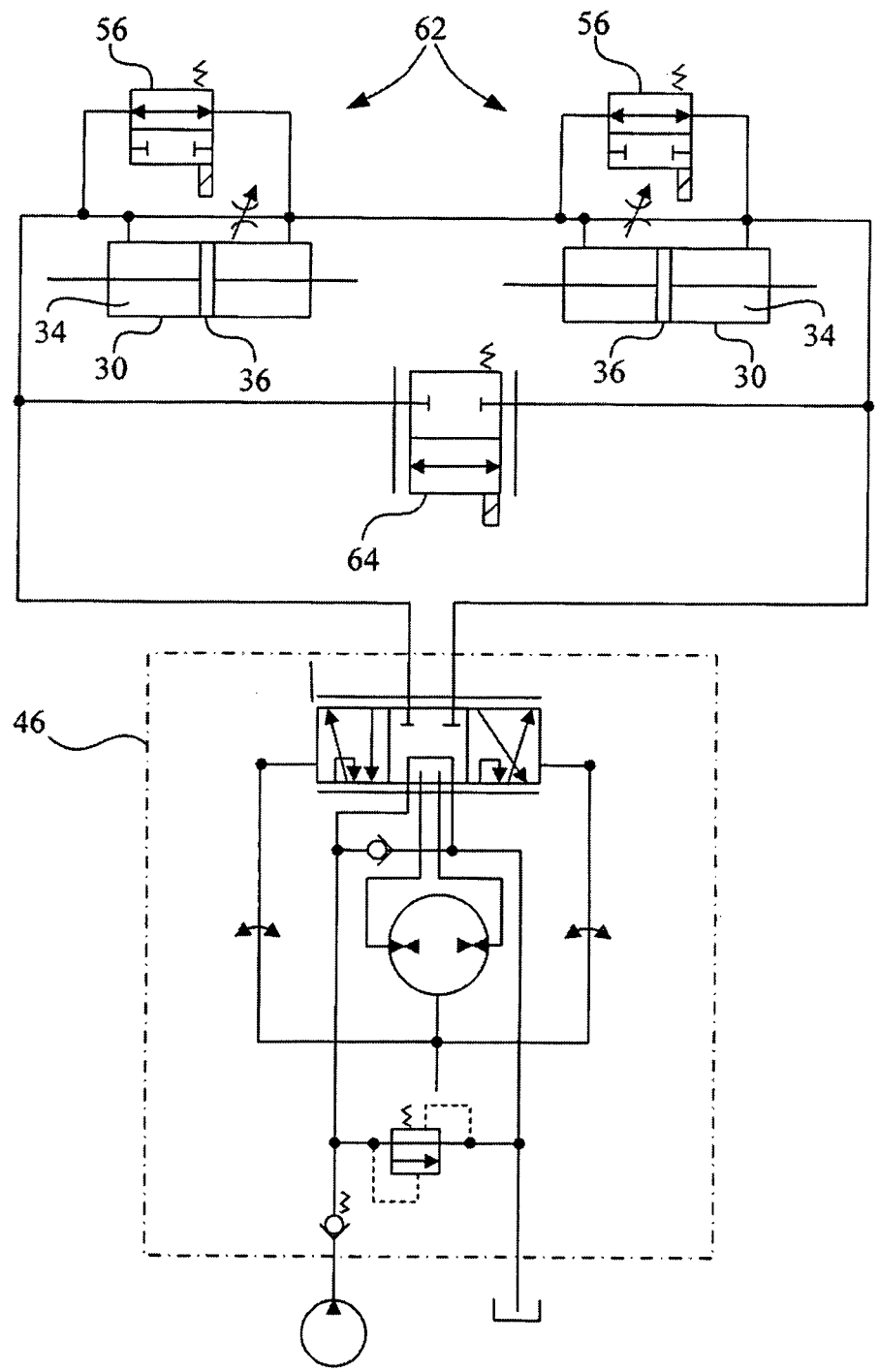
FIG. 4 is a schematic illustration of another embodiment of a turn assist arrangement of the present invention.

Referring now to FIG. 4, another embodiment of a turn assist arrangement 62 for caster wheels 22 is shown coupled with hydraulic steering circuit 46. Turn assist arrangement 62, includes a pair of turn assist cylinders 30 coupled in series using a fluid tie rod arrangement, similar to the embodiment shown in FIG. 3 and described above. Turn assist arrangement 62 also includes a pair of direction change valves 56 coupled in parallel with a corresponding turn assist cylinder 30. Each direction change valve 56 is also substantially the same as described above with respect to the embodiment shown in FIG. 3. Turn assist arrangement 62 primarily differs in that it includes a proportional valve 64 connected in parallel between turn assist cylinders 30.

Proportional valve 64 is open at lower ground speeds to allow free parallel movement of turn assist cylinders 30. Proportional valve 64 begins to close at approximately the same speed as direction change orifices 56 close as described above, i.e., at approximately the first threshold value. Proportional valve 64 closes proportional to increasing speed to a second threshold value, then remains closed at speeds higher than the second threshold value. Proportional valve 64 softens the transition between the dual path hydrostatic system at low speeds and the rear steer system turn assist at higher transport speeds.

Figure 5:
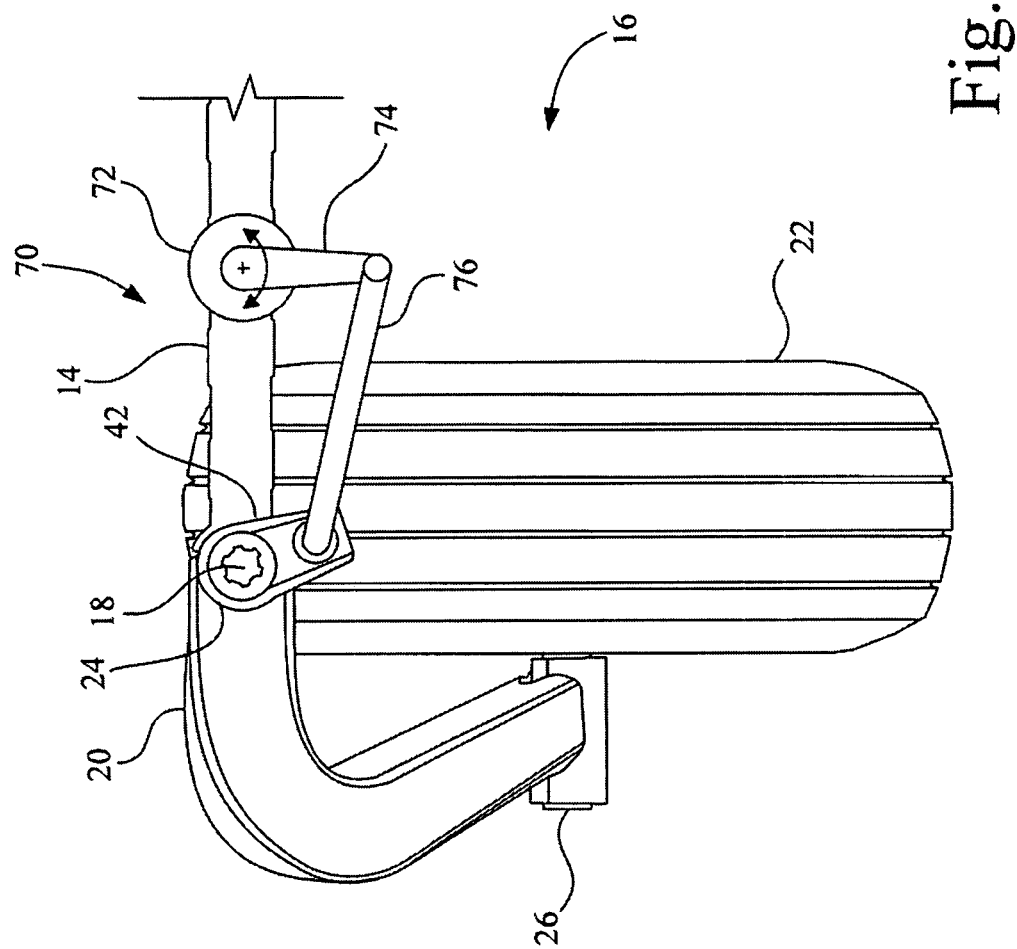
FIG. 5 is a top view of another embodiment of a turn assist arrangement of the present invention.

Referring now to FIG. 5, there is shown another embodiment of a turn assist arrangement 70 of the present invention. Turn assist arrangement 70 includes at least one rotary actuator 72, rather than a linear actuator as described above with reference to FIGS. 1 and 2. Rotary actuator 72 can be a hydraulic, electric or pneumatic motor capable of rotating less than or a full 360 degrees; however, rotary actuator 72 must be configured to allow full rotation of caster wheel 22 about the axis of shaft 18. Rotary actuator 72 can be controlled to apply a biasing force to caster wheel assembly 16 during an operator commanded turn, and may be overridden by forces applied by the ground to caster wheel 22. To that end, rotary actuator 72 includes a control arm 74 which is coupled with pivot arm 42 via a linkage 76. If rotary actuator 72 is configured as a hydraulic motor, then the hydraulic cylinders in the schematic of FIG. 3 may be replaced with rotary actuators, including the various orifices and valves. Alternatively, bypasses in the form of one or more clutches and/or brakes, alone or in combination with the orifices and valves shown in FIG. 3, may be used to allow the caster wheel assembly 16 to rotate when forces are applied by the ground to caster wheel 22. The other control logic remains the same, as described above.

Having described the preferred embodiment, it will become apparent that various modifications can be made without departing from the scope of the invention as defined in the accompanying claims.H

The invention claimed is:

1. A work machine, comprising:
   a frame;
   at least one drive wheel carried by said frame;
   at least one caster wheel assembly carried by said frame by way of a pivotable shaft that defines a generally vertical pivot axis around which the caster wheel assembly can rotate 360 degrees; and
   at least one turn assist arrangement, each said turn assist arrangement coupled between said frame and a corresponding said caster wheel assembly, each said turn assist arrangement being fluidly coupled with a hydraulic steering circuit of the work machine whereby a pressure differential exists in the turn assist arrangement during a turning of the work machine, the pressure differential causing a turn assist force to be applied to bias said corresponding caster wheel assembly during an operator commanded turn and to be overridden by forces applied by the ground to said caster wheel assembly.

2. The work machine of claim 1, wherein each said turn assist arrangement comprises one of a linear actuator and a rotary actuator.

3. The work machine of claim 1, wherein said at least one turn assist arrangement includes at least one turn assist cylinder, each said turn assist cylinder coupled between said frame and a corresponding said caster wheel assembly, each said turn assist cylinder including a two-way cylinder with a housing defining an inner chamber, a piston slidably disposed in said inner chamber, and a rod extending from said piston through said housing, said inner chamber on each side of said piston being fluidly coupled with the hydraulic steering circuit whereby a pressure differential on opposite sides of said piston exists during turning of said work machine.

4. The work machine of claim 3, wherein each said caster wheel assembly includes a pivotable shaft, a wheel arm and a caster wheel coupled with said wheel arm, each said housing connected to one of said frame and said corresponding shaft, each said rod connected to an other of said frame and said corresponding shaft.

5. The work machine of claim 4, wherein each said caster wheel assembly includes a pivot arm having one end which is coupled with and extends radially from said shaft, and an opposite end which is coupled with a corresponding said turn assist cylinder.

6. The work machine of claim 4, wherein said housing is connected to said frame, and said rod is connected to said corresponding caster wheel assembly.

7. The work machine of claim 3, wherein said at least one drive wheel comprises a pair of drive wheels, and said hydraulic steering circuit is one of:
   integral with a dual-path hydrostatic system associated with said drive wheels; and
   a stand-alone hydraulic circuit which is separate from said dual-path hydrostatic system.

8. The work machine of claim 3, wherein said at least one drive wheel includes two drive wheels and two hydraulic drive wheel motors respectively associated with said drive wheels, each said drive wheel motor having an inlet, each said inlet being fluidly coupled with each said turn assist cylinder, such that an inlet of one said drive wheel motor is fluidly coupled with said inner chamber on one side of said piston and an inlet of an other said drive wheel motor is fluidly coupled with said inner chamber on an opposite side of said piston.

9. The work machine of claim 3, wherein said at least one turn assist cylinder comprises two turn assist cylinders, each said turn assist cylinder coupled between said frame and a corresponding said caster wheel assembly.

10. The work machine of claim 9, including a pair of low speed field orifices, each said field orifice being fluidly connected in parallel with a corresponding said turn assist cylinder on opposite sides of said corresponding piston, each said field orifice being open at a ground speed at or below a first threshold value.

11. The work machine of claim 9, including a pair of higher speed transport orifices, each said transport orifice being fluidly connected in parallel with a corresponding said turn assist cylinder on opposite sides of said corresponding piston.

12. The work machine of claim 9, including a pair of high pressure relief valves, each said high pressure relief valve being fluidly connected in parallel with a corresponding said turn assist cylinder on opposite sides of said corresponding piston, each said high pressure relief valve being openable above a predetermined a fluid pressure.

13. The work machine of claim 9, including a pair of machine direction change valves, each said machine direction change valve being fluidly connected in parallel with a corresponding said turn assist cylinder on opposite sides of said corresponding piston, each said machine direction change valve being open during an operator commanded change in direction of said work machine.

14. The work machine of claim 9, including a proportional valve connected in parallel between said two turn assist cylinders, said proportional valve being open below a ground speed at a first threshold value, beginning to close when said ground speed is at said first threshold value, and closed when said ground speed is at a second threshold value, said proportional valve closing linearly proportional to an increase in ground speed between said first threshold value and said second threshold value.

15. The work machine of claim 3, wherein said at least one caster wheel assembly is a pair of caster wheel assemblies, and said at least one turn assist cylinder comprises one of:
   a pair of turn assist cylinders, each said turn assist cylinder coupled between said frame and a corresponding said caster wheel assembly;
   a single turn assist cylinder coupled between said frame and one said caster wheel assembly; and
   a single turn assist cylinder coupled between said frame and one said caster wheel assembly, said one caster wheel assembly coupled via a tie rod with an other said caster wheel assembly.

16. The work machine of claim 3, wherein each said turn assist cylinder includes a second rod extending from said piston through said housing, said rod and said second rod being disposed on opposite sides of said piston, said second rod providing an equal fluid displacement from said inner chamber regardless of a travel direction of said piston.

17. A steering arrangement for a work machine, comprising:
   a frame;
   a caster wheel assembly carried by said frame; and
   a turn assist arrangement coupled between said frame and said caster wheel assembly, said turn assist arrangement being fluidly coupled with a hydraulic steering circuit of the work machine whereby a pressure differential exists in the turn assist arrangement during a turning of the work machine, the pressure differential causing a turn assist force to be applied to:
   a) apply a biasing force to said caster wheel assembly during an operator commanded turn, b) allow said biasing force to be overridden by forces applied by the ground to said caster wheel assembly, and c) allow said caster wheel assembly to rotate 360° about a generally vertical axis.

18. The steering arrangement of claim 17, wherein said caster wheel assembly includes a pivotable shaft coupled with a wheel arm, a caster wheel coupled with said wheel arm, and a pivot arm having one end which is coupled with and extends radially from said shaft, and an opposite end which is coupled with said turn assist arrangement.

19. The steering arrangement of claim 17, wherein said turn assist arrangement includes a turn assist cylinder with a housing defining an inner chamber, a piston slidably disposed in said chamber, and a rod extending from said piston through said housing, and further including:

a low speed field orifice fluidly connected in parallel with said turn assist cylinder on opposite sides of said piston, said field orifice being open at a ground speed at or below a first threshold value; and a higher speed transport orifice fluidly connected in parallel with said turn assist cylinder on opposite sides of said piston.

20. The steering arrangement of claim 19, wherein each said turn assist cylinder includes a second rod extending from said piston through said housing, said rod and said second rod being disposed on opposite sides of said piston, said second rod providing an equal fluid displacement from said inner chamber regardless of a travel direction of said piston.

21. A work machine, comprising:

a frame;

at least one caster wheel assembly carried by said frame, each said caster wheel assembly including a caster wheel and a pivotable shaft defining a generally vertical axis; and at least one turn assist arrangement, each said turn assist arrangement being coupled between said frame and a corresponding said caster wheel assembly, each said turn assist arrangement fluidly coupled with a hydraulic steering circuit of the work machine whereby a pressure differential exists in the turn assist arrangement during a turning of the work machine, the pressure differential causing a turn assist force to be applied biasing said corresponding caster wheel during an operator commanded turn and allowing said caster wheel to rotate 360° about said axis of said shaft.

22. The work machine of claim 21, wherein each said turn assist arrangement comprises one of a linear actuator and a rotary actuator.

23. The work machine of claim 22, wherein each said turn assist arrangement includes at least one of:

a) at least one fluid orifice;

b) at least one clutch; and c) at least one brake.

24. The work machine of claim 21, wherein said biasing applied to said corresponding caster wheel assembly during an operator commanded turn may be overrode by forces applied by the ground to said caster wheel.

25. The work machine of claim 21, wherein each said caster wheel assembly includes a pivot arm having one end which is coupled with and extends radially from said shaft, and an opposite end which is coupled with a corresponding said turn assist arrangement.

* * * * *